United States Patent [19]

Naffziger et al.

[11] Patent Number: 5,757,687
[45] Date of Patent: May 26, 1998

[54] METHOD AND APPARATUS FOR BOUNDING ALIGNMENT SHIFTS TO ENABLE AT-SPEED DENORMALIZED RESULT GENERATION IN AN FMAC

[75] Inventors: Samuel D. Naffziger, Fort Collins, Colo.; Rodolfo G. Beraha, Los Altos, Calif.

[73] Assignee: Hewlett-Packard Co., Palo Alto, Calif.

[21] Appl. No.: 692,655

[22] Filed: Aug. 6, 1996

[51] Int. Cl.$^6$ .................................................. G06F 7/38
[52] U.S. Cl. .................................................. 364/748.07
[58] Field of Search ........................ 364/748, 715.04, 364/748.07

[56] References Cited

U.S. PATENT DOCUMENTS

| | | | |
|---|---|---|---|
| 4,926,369 | 5/1990 | Hokenek et al. | 364/748 |
| 4,969,118 | 11/1990 | Montoye et al. | 364/748 |
| 5,208,490 | 5/1993 | Yetter . | |
| 5,530,663 | 6/1996 | Garcia et al. | 364/748 |

OTHER PUBLICATIONS

A.D. Booth, "A Signed Binary Multiplication Technique", Quarterly Journal of Mechanics and Applied Mathematics, 4(2):236–240, (Jun. 1951).

O.L. MacSorley, "High–Speed Arithmetic in Binary Computers", Proceeding of the IRE, 49(1):67–91, (Jan. 1961).

ANSI/IEEE Standard for Binary Floating–Point Arithmetic, STD 754–1985, IEEE, New York, Aug. 12, 1985.

E.K. Hokenek and R.K. Montoye in "Leading–Zero Anticipator (LZA) in the IBM Risc System/6000 Floating–Point Execution Unit," IBM J. Res. Develop. 34, 71–77 (Jan. 1990).

R.K. Montoye, E. Hokenek, and S.L. Runyon in "Design of the IBM RISC System/6000 Floating–Point Execution Unit," IBM J. Res. Develop. 34, 59–70 (Jan. 1990).

N. Quach and M. Flynn, "High–Speed Addition in CMOS", Stanford Technical Report.:CSL–TR–90–415, Feb. 1990.

N.T. Quach and M.J. Flynn in "Leading One Prediction–Implementation, Generalization, and Application", Stanford Tech. Rep. CSL–TR–91–463 (Mar. 1991).

M. Flynn, "Topics in Arithmetic for Digital Systems Designers" pp. 89–94, 102–105 (Preliminary Second Edition §1992).

Primary Examiner—Tan V. Mai

[57] ABSTRACT

Method and apparatus for bounding alignment shifts to enable at-speed denormalized result generation in an FMAC (fused multiply accumulate unit; also known as a multiply-add-fused floating-point unit, or MAF/FPU). The method and apparatus force a one into an FMAC's (leading bit anticipator) at a point which is determined to yield proper alignment of a potential denormalized result (denorm result). The precise location of the forced one is determined through a comparison of the FMAC's operand exponents. If the FMAC result is indeed a denorm, the shifter will only shift up to the position of the forced one, thereby leaving the exponent at zero and producing an FMAC result with a denormalized mantissa.

13 Claims, 6 Drawing Sheets

METHOD AND APPARATUS FOR BOUNDING ALIGNMENT SHIFTS TO ENABLE AT-SPEED DENORMALIZED RESULT GENERATION IN AN FMAC

BACKGROUND OF THE INVENTION

This invention pertains to the generation of a denormalized result in an FMAC (floating-point multiply accumulate unit), and more particularly, to the at-speed generation of a denormalized FMAC result by way of a bounded alignment shift. At-speed generation of a denormalized FMAC result is important since denormalization apparatus lies directly in an FMAC's critical path.

The speed and accuracy of microprocessor calculations have been greatly increased in recent years by fusing multiply and add operations into the accumulate operation (A*B)+C. If it is desired to merely add or multiply two numbers, the operation A*B can be performed by setting C=0, and the operation A+C can be performed by setting B=1. The component of a CPU which performs the (A*B)+C operation is commonly referred to as an FMAC (floating-point multiply accumulate unit) or MAF/FPU (multiply-add-fused floating-point unit). A conventional MAF/FPU design is disclosed by R. K. Montoye, E. Hokenek, and S. L. Runyon in "Design of the IBM RISC System/6000 Floating-Point Execution Unit," *IBM J. Res. Develop.* 34, pp. 59–70 (January 1990).

The inputs to an FMAC are the operands A (multiplicand), B (multiplier) and C (addend), where A, B and C are floating-point numbers (floating-point numbers are numbers expressed in scientific notation). IEEE has issued the accepted standard for representing floating-point numbers. *ANSI/IEEE Standard for Binary Floating-Point Arithmetic*, STD 754-1985, IEEE, New York, Aug. 12, 1985. The convention given for representing single-(32-bit) and double-precision (64-bit) floating-point numbers in binary form is [S,E,M], where S is a single bit determining the sign of a number, E is an exponent, and M is a mantissa (i.e., a fraction stripped of its leading 1). Thus, the form of an IEEE floating-point number is $[(-1)^S]*[2^{(E+Bias)}]*(1.M)$. In a single precision system, E is represented by eight bits, and M is represented by twenty-three bits (the twenty-three bit mantissa becomes a twenty-four bit mantissa when the floating-point number is input into an FMAC since operations performed internal to the FMAC require that a mantissa's implied leading 1 be present). In a double precision system, E is represented by eleven bits, and M is represented by fifty-two bits (fifty-three bits while the mantissa is internal to the FMAC). The exponent Bias is 127 (single precision) or 1023 (double precision).

After A, B and C operands have been input into an FMAC, and the (A*B) multiplication and (A*B)+C addition operations have been completed, the (A*B)+C mantissa may be preceded by a string of leading zeros (i.e., zeros in the most significant bit positions of the mantissa). Typically, leading zeros in the mantissa are undesirable, as they interfere with the ability to strip the mantissa of its leading one and output an FMAC result in the accepted IEEE form. An FMAC mantissa preceded by leading zeros is said to be in "denormalized" form.

The process of shifting a mantissa so that its most significant bit is a "1" is called "normalization". Normalization is performed by a leading bit anticipator (LBA; alternatively called a leading zero anticipator or LZA). LZA's are described in detail in E. K. Hokenek, and R. K. Montoye, "Leading-Zero Anticipator (LZA) in the IBM RISC System/6000 Floating-Point Execution Unit," *IBM J. Res. Develop.* 34, pp. 71–77 (January 1990).

In brief, normalization requires 1) left-shifting the mantissa of an FMAC result by N bit positions, and 2) subtracting N from the exponent of the FMAC result. However, in certain situations, an FMAC result may be of such a low order that normalization would result in underflowing the FMAC result's exponent. Since this is prohibited by the IEEE standard, an FMAC result of such low order will only be partially normalized (i.e., it will not be normalized past a point which results in underflow of its exponent). Its mantissa will therefore remain in a denormalized form, and it will be interpreted as such by an FMAC or microprocessor. An FMAC result with a denormalized mantissa and exponent of zero (that is, its exponent will be zero internal to the FMAC) will be referred to herein as a denormalized FMAC result.

In the past, denormalization has been handled by 1) generating a normalized result with an underflowed exponent, and then 2) sending the normalized result and underflowed exponent to a separate shift and add unit. In the add unit, the underflowed exponent would be incremented by one until it was equal to zero. Simultaneously, and for each incrementation of the underflowed exponent, the normalized result would be right-shifted by one bit position. The result output from the shift and add unit would be in an accepted IEEE form (i.e., having a denormalized mantissa with exponent of zero). Conventional denormalization of an FMAC result has therefore required an addition which is performed within the FMAC's critical timing path. As is well known in the art, an adder contributes significant delay to a critical timing path.

It is therefore a primary object of this invention to provide a method and apparatus for generating denormalized FMAC results "at-speed" (i.e., as quickly as a normalized FMAC result can be generated).

It is a further object of this invention to provide a method of generating a denormalized FMAC result by way of a bounded alignment shift.

It is also an object of this invention to provide apparatus for generating a denormalized FMAC result, wherein the apparatus can be largely incorporated into an FMAC's leading bit anticipator (LBA).

SUMMARY OF THE INVENTION

In the achievement of the foregoing objects, the inventors have devised a method and apparatus which force a one into an FMAC's LBA at a point which is determined to yield proper alignment of a potential denormalized result (sometimes referred to herein as a "denorm" result). The precise location of the forced one is determined through a comparison of the FMAC's operand exponents. If the FMAC result is indeed a denorm, a shifter will only shift the FMAC result's mantissa up to the position of the forced one, thereby leaving its associated exponent at zero and producing a denormalized result in the accepted IEEE form.

These and other important advantages and objectives of the present invention will be further explained in, or will become apparent from, the accompanying description, drawings and claims.

BRIEF DESCRIPTION OF THE DRAWINGS

An illustrative and presently preferred embodiment of the invention is illustrated in the drawings in which.

DESCRIPTION OF THE PREFERRED EMBODIMENT

Figure 5:
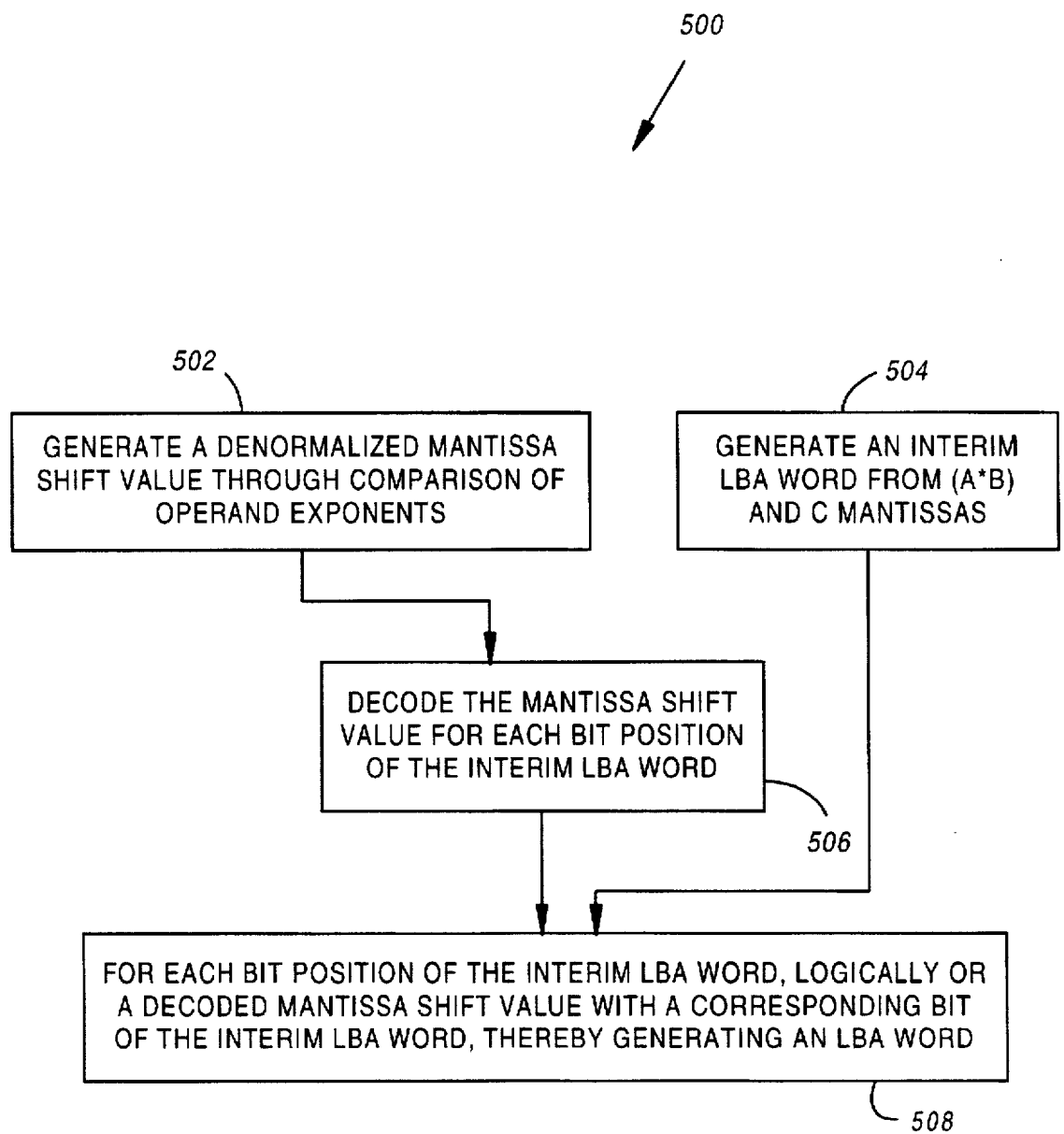
FIG. 5 is a flowchart illustrating the general steps involved in generating an LBA word for use in denormalized FMAC result generation.

A method 500 of generating an LBA word (322, FIG. 3) for use in denormalized FMAC result generation is pictured generally in FIG. 5. The method 500 may comprise the step of generating a denormalized mantissa shift value 330 (FIG. 3) through exponent comparison 502. The exponents compared are those of the input operands A, B and C, which will be respectively referenced herein as EXP(A), EXP(B) and EXP(C). The denormalized mantissa shift value 330 (also referred to herein as merely a mantissa shift value) will be described in the following paragraphs, but in general, is a value which dictates a boundary beyond which the mantissa of a denormalized FMAC result will not be shifted. This boundary coincides with an FMAC result having an exponent of zero (i.e., a zero exponent internal to the FMAC). Substantially in parallel with the generation of a denormalized mantissa shift value 330, an interim LBA word 302 may be generated from (A*B) and C mantissas 504. The (A*B) mantissa is a mantissa resulting from the multiplication of operands A and B, and is approximately twice the length of either the mantissa of A or the mantissa of B. The method 500 may further comprise the step of decoding 506 the mantissa shift value 330 for each bit position of the interim LBA word 302. Finally, and for each bit position of the interim LBA word 302, a decoded mantissa shift value 332 may be logically ORed with a corresponding bit 334 of the interim LBA word 302 to generate 508 an LBA word 322 (see FIGS. 3 & 5).

Figure 6:
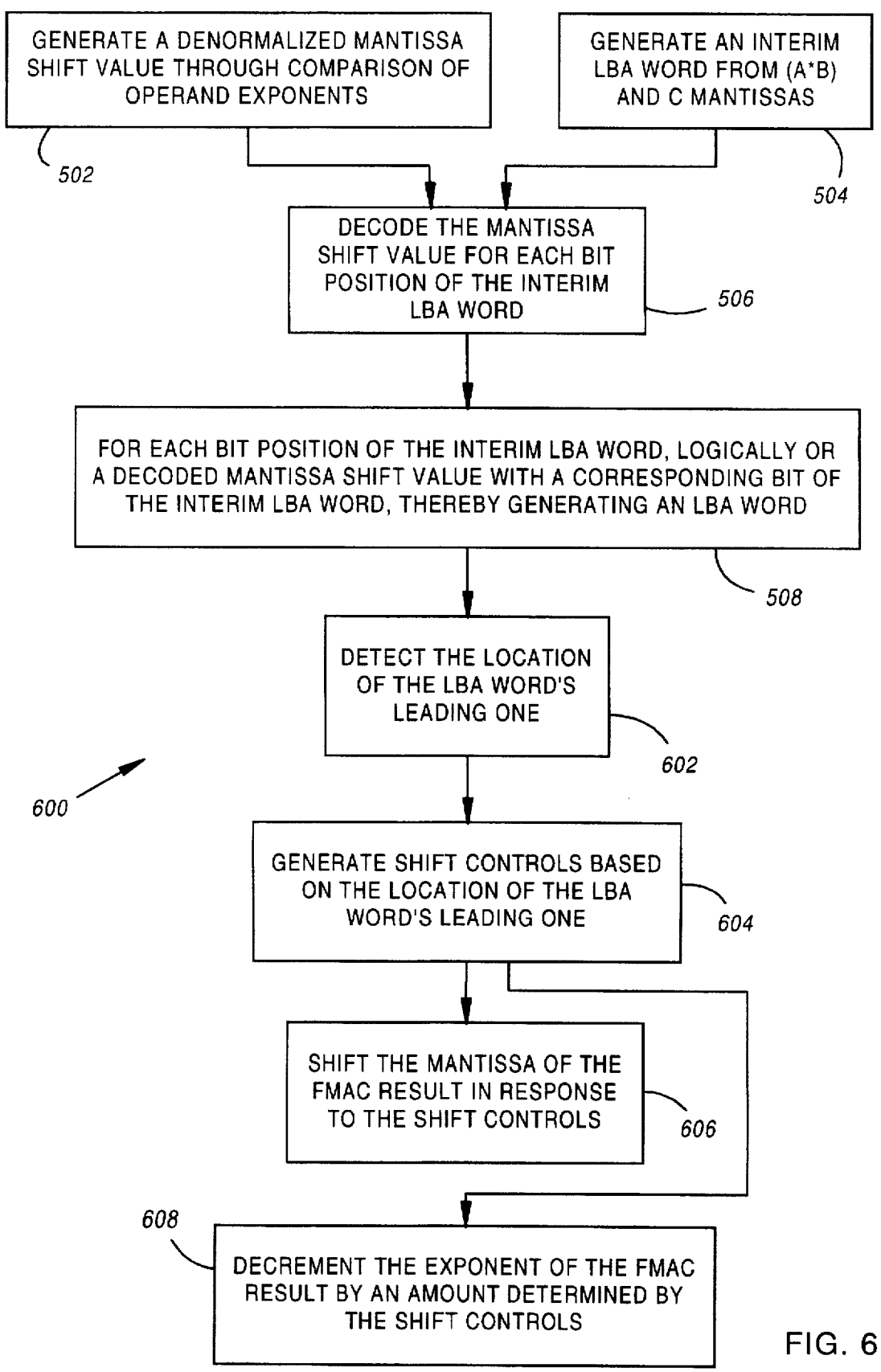
FIG. 6 is a flowchart illustrating the general steps involved in producing an at-speed denormalized FMAC result.

The above steps 502–508 may be incorporated into a method 600 of generating a denormalized FMAC result of form (A*B)+C by way of a bounded alignment shift, as pictured in FIG. 6. The method 600 of FIG. 6 may continue from the above method 500 with a detection of the location of the LBA word's leading one 602. Shift controls (326, FIG. 3) may be generated based on this location 604. The shift controls 326 may then be used to control a shifter 218 (FIG. 2) which is capable of left-shifting the mantissa of the FMAC result 606. The shift controls 326 may also be used in decrementing the exponent of the FMAC result such that the result's exponent is decremented 608 by an amount equal to the number of bit positions which the FMAC result's mantissa was left-shifted 606.

Figure 3:
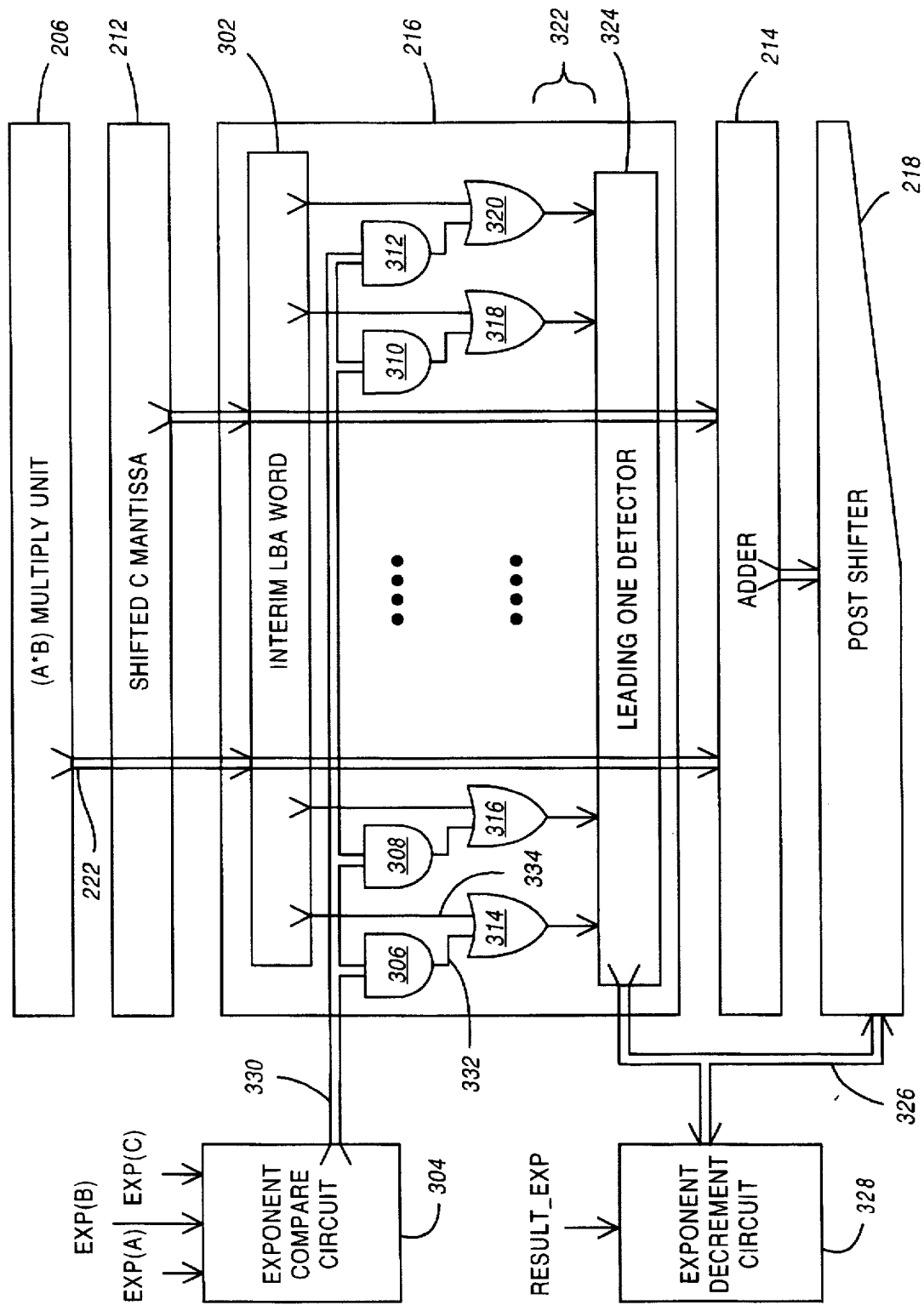
FIG. 3 is a schematic illustrating an LBA and associated components which produce shift controls enabling the production of a denormalized FMAC result.

The first of the above methods 500 may be incorporated into the hardware of an FMAC's LBA 216, and exponent logic 304 associated with same, as pictured in FIG. 3. The second of the above methods 600 may be incorporated into an FMAC's LBA 216, post shifter 218, and associated exponent logic 304, 328, as also pictured in FIG. 3.

Having generally described methods 500, 600 and apparatus 216, 218, 304, 308 for generating a denormalized FMAC result "at-speed" by way of a bounded alignment shift, the methods 500, 600 and apparatus 216, 218, 304, 308 will now be described in greater detail.

Figure 1:
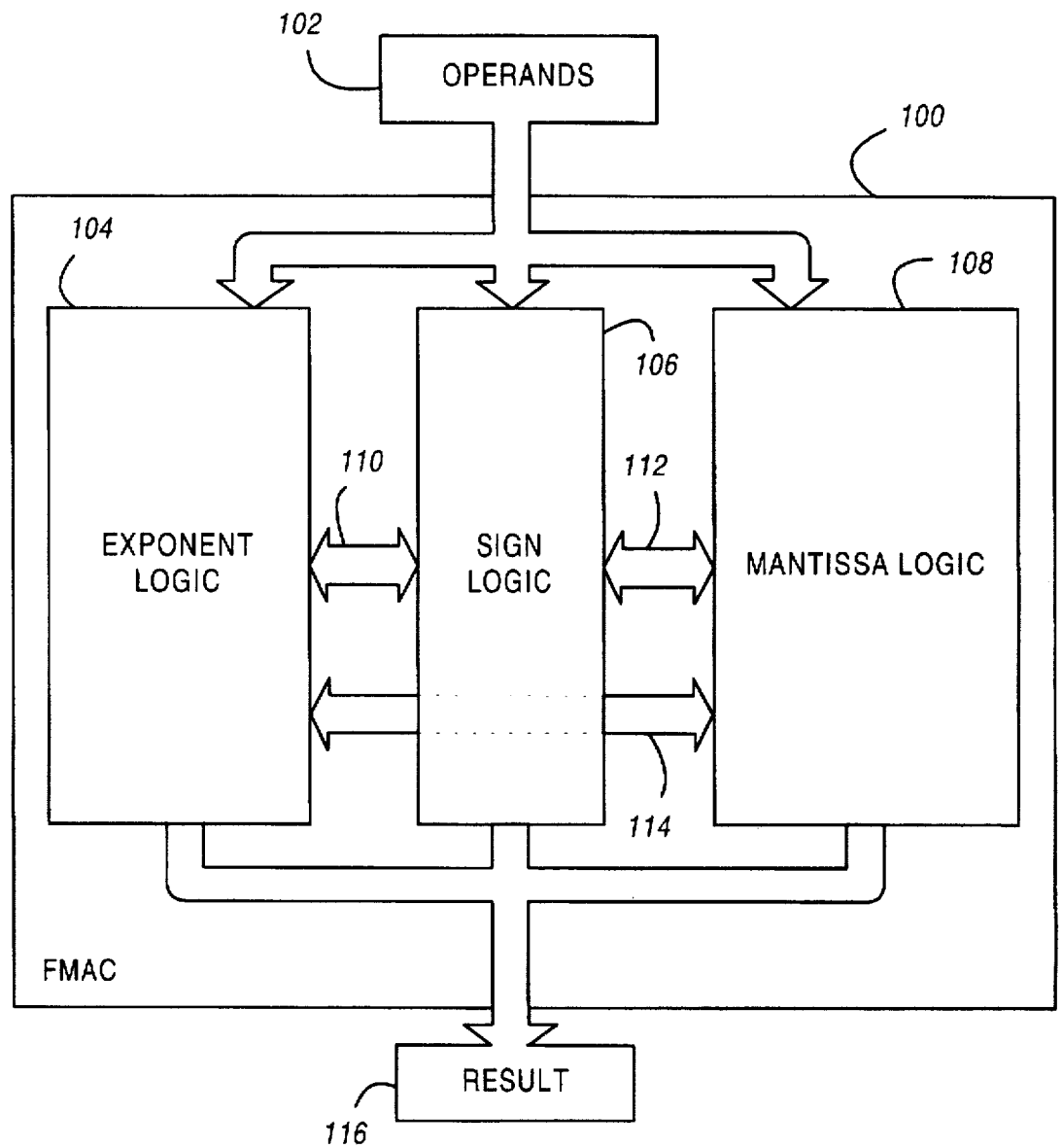
FIG. 1 is a schematic illustrating the general layout of a FMAC.
Figure 2:
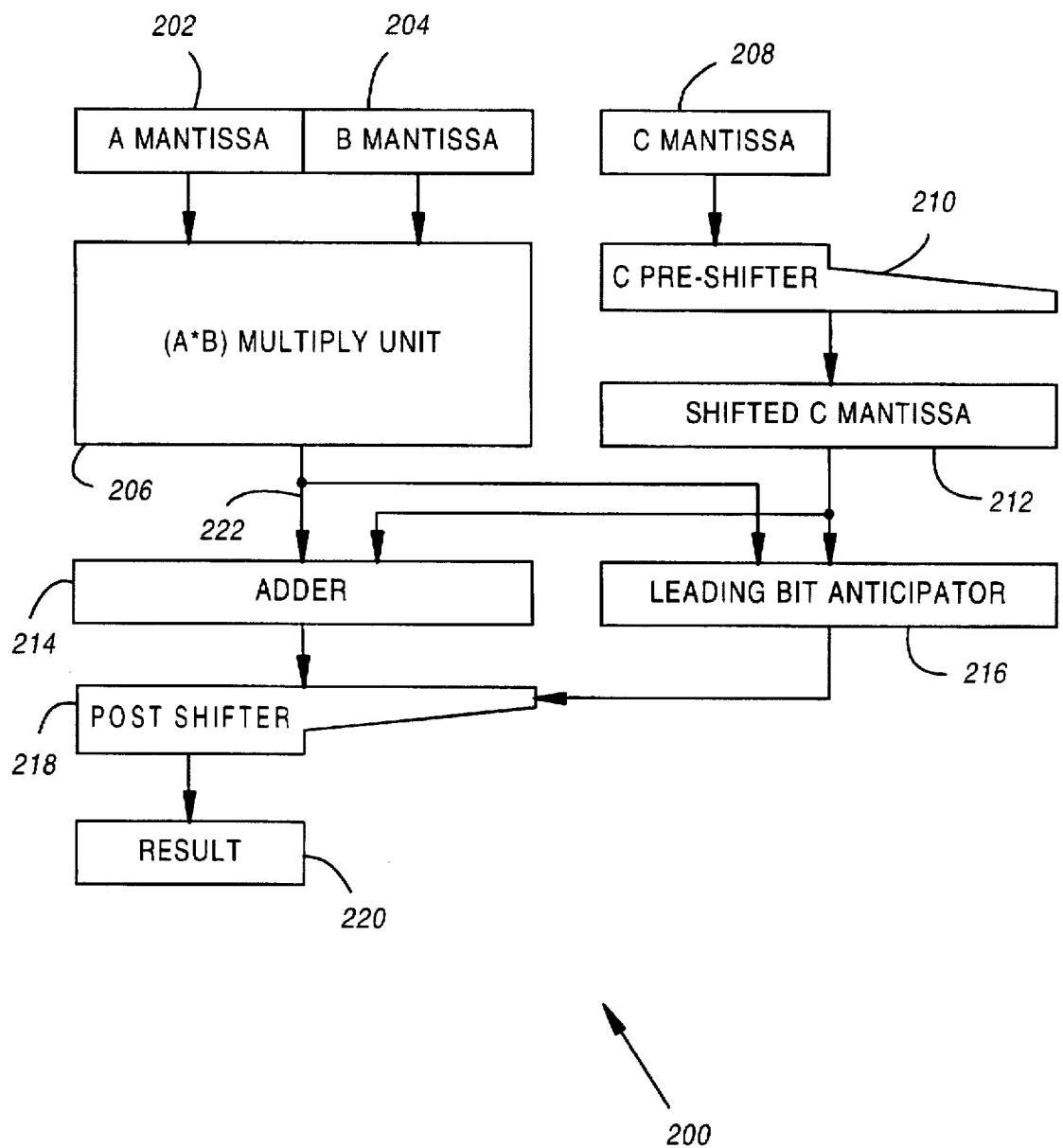
FIG. 2 is a schematic illustrating functional components of an FMAC through which mantissa data flows.

A schematic of a floating-point multiply accumulate (FMAC) unit 100 is pictured in FIGS. 1–3. A, B and C operands 102 are input into the FMAC 100 as shown in FIG. 1. Logic 104–108 within the FMAC 100 is then used to calculate a result 116 of the form (A*B)+C. Each of the operands 102 comprises a sign bit, an exponent, and a mantissa. For the most part, operations are performed in parallel on the operands' sign bits, exponents and mantissas (e.g., by exponent 104, sign 106, and mantissa 108 logic blocks), and operations performed on one component of an operand are largely independent of operations performed on another component of an operand. However, as shown in FIG. 1, bits of information may be passed between the various logic blocks 104–108 as needed 110–114. The output of the FMAC 100 is a result 116 in appropriate IEEE form (i.e., [S,E,M]) which may be returned to a microprocessor.

The mantissa logic 108 of the FMAC 100 generally comprises a multiply unit 206, an adder 214, a plurality of shifters 210, 218, and a leading bit anticipator 216, coupled to perform a floating-point multiply accumulate operation. See FIG. 2. The mantissas of operands A and B 202, 204 are input into the multiply unit 206, thereby generating an (A*B) mantissa 222. The length of the (A*B) mantissa 222 will be approximately twice the length of the mantissa of either A or B 202, 204. FMAC multiply units 206 are well known in the art, and examples of same are disclosed in A. D. Booth, "A Signed Binary Multiplication Technique", *Quarterly Journal of Mechanics and Applied Mathematics*, 4(2):236–240, (June 1951) and O. L. MacSorley, "High-Speed Arithmetic in Binary Computers", Proceedings of the IRE, 49(1):67–91, (January 1961), which are hereby incorporated by reference for all that they disclose.

In parallel with the above multiplication function, the mantissa of the C operand 208 is input into a C preshifter 210. The C pre-shifter aligns and extends the C mantissa 208 with the (A*B) mantissa 222 so that bits of corresponding magnitude of the (A*B) 222 and shifted C 212 mantissas may be added. Shifters 210, 218 are also well known in the art, and examples of same are disclosed in the U.S. patent application of Miller Ser. No. 08/609,305 filed Mar. 1, 1996, entitled "Dynamic 1-of-$2^N$ Logic Encoding", and in R. K. Montoye, E. Hokenek, and S. L. Runyon, "Design of the IBM RISC System/6000 Floating-Point Execution Unit," *IBM J. Res. Develop.* 34, pp. 64–66 (January 1990). These references are hereby incorporated by reference for all that they disclose.

After generating (A*B) 222 and shifted C 212 mantissas, the mantissas 222, 212 are simultaneously (at least substantially so) input into an adder 214 and a leading bit anticipator 216. Conventional adders 214 are disclosed in M. Flynn, "Topics in Arithmetic for Digital Systems Designers" pp. 89–94, 102–105 (Preliminary Second Edition §1992); N. Quach and M. Flynn, "High-Speed Addition in CMOS", Stanford Technical Report.: CSL-TR-90-415, February 1990; and the U.S. patent application of Naffziger filed on or about May 31, 1996 entitled "High Speed Addition Using Ling's Equations and Dynamic CMOS Logic". These disclosures are hereby incorporated by reference for all that they disclose. Leading bit anticipators 216 are disclosed in E. K. Hokenek, and R. K. Montoye, "Leading-Zero Anticipator (LZA) in the IBM RISC System/6000 Floating-Point Execution Unit," *IBM J. Res. Develop.* 34, 71–77 (January 1990) and N. T. Quach and M. J. Flynn, "Leading One Prediction - Implementation, Generalization, and Application", Stanford Tech. Rep. CSL-TR-91-463 (March 1991), which are also incorporated by reference for all that they disclose.

The changes which need to be made to a conventional FMAC 100 in order to allow for at-speed generation of a denormalized FMAC result 220 lie largely within the leading bit anticipator (LBA) 216 of an FMAC 100, and the manner in which it generates an LBA word 322. See FIG. 3.

An LBA 216 of conventional design may operate by examining groups of three adjacent bits derived from the multiply unit 206, and corresponding groups of three adjacent bits derived from the shifted C register 212. Refer to Quach and Flynn, "Leading One Prediction - Implementation, Generalization, and Application". Calculations based on these groups of three bits result in the generation 504 (FIG. 5) of an LBA word, which in FIG. 3 has been designated as an "interim" LBA word 302. As described below, additional operations 508 must be performed on the interim LBA word 302 to generate an LBA word 322 which allows for at-speed generation of a denormalized FMAC result 220.

The LBA word 322 (FIG. 3) is a word equal in length to the length of the (A*B) 222 and shifted C 212 mantissas. The LBA word 322 comprises a bit string that has a logic "1" in any bit position which "could" be the leading bit of the adder's sum (i.e., the mantissa of the FMAC result 220). The leading bit of an adder's sum 220 is the bit of most significance comprising a logic "1". The LBA word 322 is fed into a leading one detector 324 which examines bits of the LBA word 322 from most significant to least significant to determine the location (i.e., bit position) of the LBA word's leading "1" 602 (FIG. 6). This location is then used to generate 604 shift controls 326 for controlling the FMAC's post shifter 218. The post shifter 218 will receive the output of the (A*B)+C adder 214, and will shift 606 the (A*B)+C mantissa so that its most significant bit position is occupied by the unshifted (A*B)+C mantissa's leading "1". Substantially simultaneously, the amount by which the (A*B)+C mantissa is left-shifted is subtracted 608 from the exponent of the FMAC result in an exponent decrement circuit 328. The leading one of the shifted (A*B)+C mantissa may then be dropped as an FMAC result is output in the accepted IEEE format.

Figure 4:
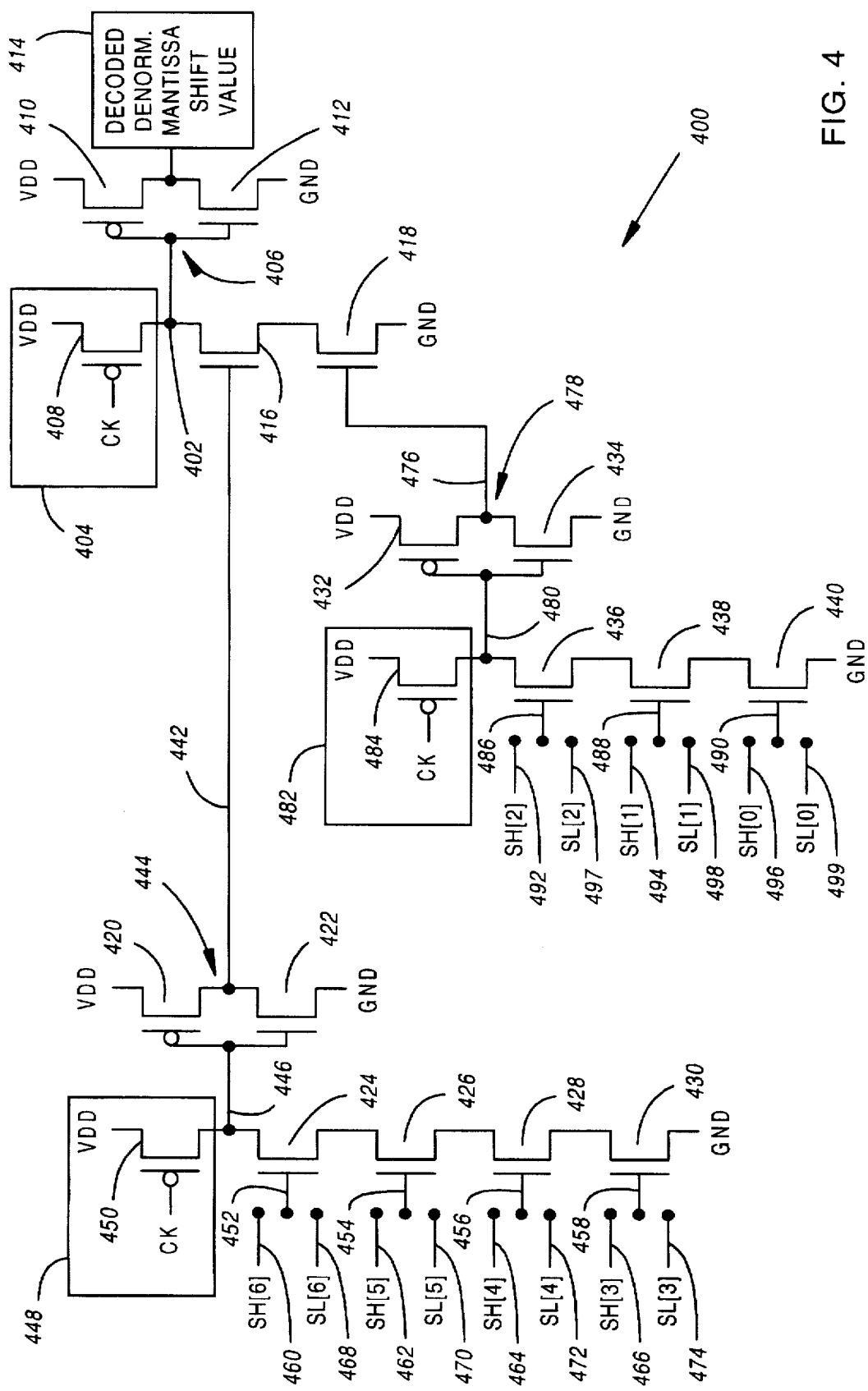
FIG. 4 is a schematic illustrating the high rail component of a dual rail circuit for decoding a denormalized mantissa shift value, SHIFTMAX.

The modifications which are required of an LBA 216 and associated exponent logic 304, 328 for the purpose of generating a denormalized FMAC result are pictured from a hardware standpoint in FIGS. 3 and 4, and as a method in FIGS. 5 and 6.

The first modification requires that a denormalized mantissa shift value 330 (FIG. 3) be generated 502 (FIG. 5). The mantissa shift value 330 is generated through a comparison of operand exponents (i.e., EXP(A), EXP(B), EXP(C)).

As earlier stated, normalization involves left-shifting the (A*B)+C mantissa so that its most significant bit is a "1". Left-shifting becomes necessary when the C operand is negative, and EXP(A)+EXP(B)=EXP(C). In this situation, upper bits of the (A*B) 222 and C 212 mantissas may cancel one another as they are added, thereby yielding an (A*B)+C mantissa having one or more "0"'s preceding a leading "1". The goal of generating a denormalized mantissa shift value 330 is to generate a value which avoids left-shifting the (A*B)+C mantissa so as to underflow its associated exponent. Exponent underflow is prohibited, and the IEEE standard for floating-point numbers dictates that numbers of low-order (i.e., such low-order that their normalization would require underflowing their exponent) should instead be represented by a minimum allowable exponent (i.e., exponent of zero internal to the FMAC 100), and a denormalized mantissa.

The denormalized mantissa shift value 330 is derived in exponent logic 104 of the FMAC 100 (FIG. 1). The resulting exponent of an (A*B)+C FMAC result is usually calculated as:

RESULT_EXP = MAX(EXP(A)+EXP(B), EXP(C)), where RESULT_EXP is the pre-normalization exponent of the FMAC result, "+" indicates addition, and MAX() selects the maximum quantity of its parenthetical list. In order to generate 502 a denormalized mantissa shift value 330, the following calculation must be made:

SHIFTMAX = ABS(RESULT_EXP−Emin), where SHIFTMAX is the denormalized mantissa shift value 330, Emin is a minimum allowable exponent dictated by the IEEE standard for single- or double-precision floating-point numbers, and ABSO calculates the absolute value of its parenthetical argument. Emin is equal to −126 in a single-precision system, and −1022 in a double precision system. If each bit position of a $2^N$ or fewer bit interim LBA word 302 is identified by an N bit position marker, the SHIFTMAX quantity 330 should also be represented by an N bit quantity, and as such, will dictate a shift boundary. (NOTE: The preferred implementation assumes that the most significant bit position of the interim LBA word 302 is its zero bit, with less significant bits corresponding to consecutively higher numbered bit positions. However, one skilled in the art could easily program the SHIFTMAX value 330 to indicate a position in an interim LBA word 302 having opposite "endiness"—i.e., a word with a least significant bit position of zero.)

The position indicated by the denormalized mantissa shift value 330 is a position of the interim LBA word 302 which needs to be a "1" to bound the left-shifting of the (A*B)+C mantissa, thereby preventing underflow of an FMAC result's exponent. If the FMAC result is to be a denorm result, assuring that the bit position of the interim LBA word 302 specified by the mantissa shift value 330 is a "1" will ensure that the mantissa 220 of the FMAC result will be left in a denormalized form.

The N bit denormalized mantissa shift value 330 is driven to each bit position of the interim LBA word 302. At each bit position, it is decoded 506 to determine which bit position it addresses. A decoding 506 of a seven bit mantissa shift value (N=7) might involve a logical AND of the form:

$X[6] \cdot X[5] \cdot X[4] \cdot X[3] \cdot X[2] \cdot X[1] \cdot X[0]$, where, $X[I]=S[I] \cdot PM[I]+\sim S[I] \cdot \sim PM[I]$, or $X[I]=S[I] \oplus PM[I]$ and $S[I]$ is the Ith bit of the SHIFTMAX value 330, PM[I] is the Ith bit of an N bit position marker, "." indicates a logical AND function, "." indicates a logical OR function, "⊕" indicates an EXCLUSIVE OR function, and "~" indicates the inverse of a quantity. A decoder 306-312 will exist for every bit position of the interim LBA word 302.

FIG. 4 shows the high rail component 400 of an exemplary dual rail SHIFTMAX decoder. A dual rail logic system is one which requires two logic paths (i.e., high and low rail components) to represent a single logic variable. Variables S[I] and PM[I] are therefore represented by the dual logic paths (i.e., rails) of SH[I] and SL[I], or PMH[I] and PML[I]. If both rails exhibit a low logic signal, the variable is in an invalid state. If the high rail logic path exhibits a high logic signal, the variable is true. If the low rail logic path exhibits a high logic signal, the variable is false. The case wherein both rails exhibit a high logic signal is undefined, and should be prevented from occurring.

A logic gate of a dual rail system comprises high and low rail components. Each component comprises an arming mechanism, a dynamic CMOS logic block, and a buffer mechanism. In operation, the arming mechanisms supply a precharge to their respective buffers (e.g., during a clock low). Incoming logic is operated upon by the dynamic logic blocks and is used to trigger either the high or low rail buffer (e.g., during a clock high). After generating a valid output, the logic gate becomes disabled until the arming mechanisms reset the buffers (e.g., during a subsequent clock low).

In addition to being self-timed and very fast, dual rail logic also provides a seamless interface with either dynamic or static downstream logic. Dual rail logic is more fully described in the U.S. Pat. No. 5,208,490 of Yetter entitled "Functionally Complete Family of Self-Timed Dynamic Logic Circuits", which is hereby incorporated by reference for all that it discloses.

The circuit of FIG. 4 comprises a first node 402 to which connects a first arming mechanism 404, a first logic block 416, 418, and a first inverting buffer mechanism 406. The first arming mechanism 404 comprises a powered pfet 408 (i.e., a p-channel field effect transistor having either its source or drain connected to power (VDD)) driven by a clock signal, CK. When activated by the clock, the first arming mechanism 404 serves to pull the first node 402 to a high logic state (i.e., a logic "1") so that the output of the first inverting buffer mechanism 406 will be a logic low (i.e., a logic "0" representing a false or invalid state of a particular decoded denormalized shift value 414. The first inverting buffer mechanism 406 comprises a powered pfet 410 and grounded nfet 412 (i.e., n-channel fet) connected in series.

The logic block coupled to the first node 402 comprises series connected nfets 416, 418 which are capable of pulling down the first node 402 to drive the output of the first inverting buffer mechanism 406 high. Typically, the pfet 408 of the first arming mechanism 404 will be much larger than the nfets 416, 418 of the first logic block, such that the first node 402 may only be pulled down when the first arming mechanism 404 is inactive.

The nfets 416, 418 of the first logic block serve to logically AND the outputs of two additional circuits. The two additional circuits respectively output the functions XH[6]·XH[5]·XH[4]·XH[3] and XH[2]·XH[1]·XH[0], such that the first logic block ANDs the two functions together to yield a desired high rail component of a decoded denormalized mantissa shift value:

XH[6]·XH[5]·XH[4]·XH[3]·XH[2]·XH[1]·XH[0].

The first additional circuit comprises a second node 446 to which connects a second arming mechanism 448, a second logic block 424–430, and a second inverting buffer mechanism 444. The second arming mechanism 448 again comprises a powered pfet 450 driven by clock signal CK; and the second inverting buffer mechanism 444 again comprises a powered pfet 420 and grounded nfet 422 connected in series.

The logic block coupled to the second node 446 comprises series connected nfets 424–430 which are capable of pulling down the second node 446 to drive the output 442 of the second inverting buffer mechanism 444 high. A high output of the second inverting buffer mechanism 444 serves to drive one of the nfets 416 of the first logic block. Each of the nfets 424–430 of the second logic block comprises a gate 452–458 which may be alternatively connected (i.e., hardwired) to either the high 460–466 or low 468–474 rail of a SHIFTMAX bit. The selection of either a high 460–466 (i.e., SH[I]) or low 468–474 (i.e., SL[I]) rail connection is based on bit values of the particular position marker for which the SHIFTMAX value 330 is being decoded. For example, if bit PMH[6] of a seven bit position marker is a logic "1", SH[6] would be programmed to drive the gate 452 of its corresponding nfet 424. If bit PMH[5] is a logic "0", SL[5] would be programmed to drive the gate 454 of its corresponding nfet 426, and so on. Each decoder 306–312 (FIG. 3) will therefore comprise uniquely programmed nfets 424–430, 436–440 driven by the rails of a SHIFTMAX value 330.

Similarly to the first additional circuit, the second additional circuit comprises a third node 480 to which connects a third arming mechanism 482, a third logic block 436–440, and a third inverting buffer mechanism 478. The third arming mechanism 482 once again comprises a powered pfet 484 driven by clock signal CK; and the third inverting buffer mechanism 478 once again comprises a powered pfet 432 and grounded nfet 434 connected in series.

The logic block coupled to the third node 480 comprises series connected nfets 436–440 which are capable of pulling down the third node 480 to drive the output 476 of the third inverting buffer mechanism 478 high. A high output of the third inverting buffer mechanism 478 serves to drive another of the nfets 418 of the first logic block. Again, each of the nfets 436–440 of the second logic block comprises a gate 486–490 which may be alternatively connected to either the high 492–496 or low 497–499 rail of a SHIFTMAX bit. The reason for breaking the function:

XH[6]·XH[5]·XH[4]·XH[3]·XH[2]·XH[1]·XH[0] into the components XH[6]·XH[5]·XH[4]·XH[3] and XH[2]·XH[1]·XH[0] (for evaluation by two distinct circuits) is that the CMOS circuits begin to lose inherent timing advantages when more than four fets are connected in series. It simply takes too long for a signal to propagate through a series connection of five or more fets.

As taught in Yetter's U.S. Pat. No. 5,208,490, the low rail component of the circuit for generating a decoded denormalized mantissa shift value would be the dual of the circuit shown in FIG. 4.

The output 332 of a decoder 306, 400 will be logically ORed 508 with the value of a corresponding bit of the interim LBA word 302. The outputs of a plurality of OR gates 314–320 will therefore comprise an LBA word 322 which is capable of generating a denormalized FMAC result.

The LBA word 324 is examined 602 from its most significant bit to its least significant bit to determine the location of the LBA word's leading "1". This examination is accomplished by a leading one detector 324. The output of the leading one detector 324 will be one or more shift controls 326 which are capable of controlling the FMAC's post shifter 218. The shift controls 326 also control an exponent decrement circuit 328 which reduces the exponent of an FMAC result by the number of bit positions that the result's mantissa was left-shifted. In other words, the exponent decrement circuit 328 calculates:

$$\text{RESULT\_EXP} = \text{RESULT\_EXP} - \text{VALUE\_OF\_SHIFT\_CONTROLS}$$
$$= E_{min}.$$

RESULT_EXP=RESULT_EXP-VALUE_OF_SHIFT_CONTROLS=Emin.

As one can see, the goal of SHIFTMAX 330 is to avoid underflowing the exponent of an FMAC result, and instead deliver an exponent equal to Emin, and a mantissa aligned to represent a denormalized quantity.

The steps of generating 502 and decoding 506 the mantissa shift value 330 are preferably performed in parallel with the step of generating 504 the interim LBA word 302; and the steps of generating 502 the mantissa shift value 330, generating 504 the interim LBA word 302, decoding 506 the mantissa shift value 330, generating 508 the LBA word 322, detecting 602 the location of the LBA word's leading "1", and generating 604 shift controls 326 are preferably performed in parallel with the addition of the (A*B) and shifted C mantissas 222, 212.

While illustrative and presently preferred embodiments of the invention have been described in detail herein, it is to be understood that the inventive concepts may be otherwise variously embodied and employed and that the appended claims are intended to be construed to include such variations except insofar as limited by the prior art.

What is claimed is:

1. A method of generating an LBA word for use in denormalized FMAC result generation, the denormalized FMAC result being of form (A*B)+C, where A, B and C are operands input into an FMAC, and wherein each operand, and an (A*B) result, comprises an exponent and a mantissa, the method comprising the steps of:
   a) generating a denormalized mantissa shift value through comparison of operand exponents;
   b) generating a shifted C mantissa which is aligned with the (A*B) result for subsequent adding of the (A*B) and shifted C mantissas;
   c) generating an interim LBA word from the (A*B) and shifted C mantissas;
   d) decoding the denormalized mantissa shift value for each bit position of the interim LBA word; and
   e) for each bit position of the interim LBA word, logically ORing a decoded denormalized mantissa shift value with a corresponding bit of the interim LBA word, thereby generating an LBA word.

2. A method as in claim 1, wherein the steps of generating and decoding the denormalized mantissa shift value are performed in parallel with the step of generating the interim LBA word.

3. A method as in claim 2, wherein the steps of generating the denormalized mantissa shift value, generating the interim LBA word, decoding the denormalized mantissa shift value, and generating the LBA word are performed in parallel with a step of adding the mantissas of (A*B) and shifted C.

4. A method as in claim 1, wherein the step of generating the denormalized mantissa shift value comprises calculating the denormalized mantissa shift value, SHIFTMAX, as:

SHIFTMAX=ABS((MAX(EXP(A)+EXP(B), EXP(C)))—Emin), where ABS determines an absolute value of a parenthetical quantity, MAX determines a maximum of a parenthetical list, EXP designates an exponent of a parenthetical operand, and Emin is a minimum exponent value of an FMAC result.

5. A method as in claim 4, wherein the denormalized mantissa shift value is an N bit value, and each bit position of the interim LBA word is referenced by an N bit position marker, wherein a most significant bit position of the interim LBA word is bit zero, and less significant bits are referenced by consecutively greater integers, wherein the step of decoding the denormalized mantissa shift value at a particular bit position of the interim LBA word comprises the step of:

logically ANDing each bit of the denormalized mantissa shift value with a corresponding bit of the particular bit position's position marker.

6. A method of generating a denormalized FMAC result of form (A*B)+C by way of a bounded alignment shift, where A, B and C are operands, and each operand, the denormalized FMAC result, and an (A*B) result, comprises an exponent and a mantissa, the method comprising the steps of:
   a) generating a denormalized mantissa shift value through comparison of operand exponents;
   b) generating a shifted C mantissa which is aligned with the (A*B) result for subsequent adding of the (A*B) and shifted C mantissas;
   c) generating an interim LBA word from the (A*B) and shifted C mantissas;
   d) decoding the denormalized mantissa shift value for each bit position of the interim LBA word;
   e) for each bit position of the interim LBA word, logically ORing a denormalized decoded mantissa shift value with a corresponding bit of the interim LBA word, thereby generating an LBA word;
   f) detecting a location of the LBA word's leading one;
   g) generating shift controls based on the detected location of the LBA word's leading one;
   h) shifting the mantissa of the FMAC result in response to the shift controls; and
   i) decrementing the exponent of the FMAC result by an amount determined by the shift controls.

7. A method as in claim 6, wherein the steps of generating and decoding the denormalized mantissa shift value are performed in parallel with the step of generating the interim LBA word.

8. A method as in claim 7, wherein the steps of generating the denormalized mantissa shift value, generating the interim LBA word, decoding the denormalized mantissa shift value, generating the LBA word, detecting the location of the LBA word's leading one, and generating shift controls are performed in parallel with a step of adding the mantissas of (A*B) and shifted C.

9. A method as in claim 6, wherein the step of generating the denormalized mantissa shift value comprises calculating the denormalized mantissa shift value, SHIFTMAX, as:

SHIFTMAX=ABS((MAX(EXP(A)+EXP(B), EXP(C)))—Emin), where ABS determines an absolute value of a parenthetical quantity, MAX determines a maximum of parenthetical list, EXP designates an exponent of a parenthetical operand, and Emin is a minimum exponent value of an FMAC result.

10. A method as in claim 9, wherein the denormalized mantissa shift value is an N bit value, and each bit position of the interim LBA word is referenced by an N bit position marker, wherein a most significant bit position of the interim LBA word is bit zero, and less significant bits are referenced by consecutively greater integers, wherein the step of decoding the denormalized mantissa shift value at a particular bit position of the interim LBA word comprises the step of:

logically ANDing each bit of the denormalized mantissa shift value with a corresponding bit of the particular bit position's position marker.

11. Apparatus for generating an LBA word for use in denormalized FMAC result generation, the denormalized FMAC result being of form (A*B)+C, where A, B and C are operands, and wherein each operand, the denormalized FMAC result, and an (A*B) result, comprise an exponent and a mantissa, the apparatus comprising:

a) means for generating a denormalized mantissa shift value through comparison of operand exponents;

b) means for generating a shifted C mantissa which is aligned with the (A*B) result for subsequent adding of the (A*B) and shifted C mantissas;

means for generating an interim LBA word from the (A*B) and shifted C mantissas;

d) means for decoding the denormalized mantissa shift value for each bit position of the interim LBA word;

e) for each bit position of the interim LBA word, a means for logically ORing a decoded denormalized mantissa shift value with a corresponding bit of the interim LBA word, thereby generating an LBA word.

12. Apparatus as in claim 11, wherein the means for generating an interim LBA word is a leading bit anticipator.

13. Apparatus as in claim 11, wherein:

a) the denormalized mantissa shift value is an N bit value;

b) each bit position of the interim LBA word is referenced by an N bit position marker;

c) the denormalized mantissa shift value, each decoded denormalized mantissa shift value, and each bit of the interim LBA word, is a dual rail variable; and c) the means for decoding the denormalized mantissa shift value for a bit position of the interim LBA word comprises a dual rail logic circuit, the circuit comprising series connected n-channel field effect transistors, each transistor being driven by a single rail of the dual rail denormalized mantissa shift value, as determined by the bit values of a particular dual rail position marker.

* * * * *